United States Patent [19]

Miles

[11] Patent Number: 4,553,440

[45] Date of Patent: Nov. 19, 1985

[54] LIMIT MEANS FOR AIR JET RESPONSIVE GYROSCOPES

[76] Inventor: Caesar J. Miles, 1715 Portage Ave., South Bend, Ind. 46616

[21] Appl. No.: 323,193

[22] Filed: Nov. 20, 1981

[51] Int. Cl.[4] .................. G01C 19/52; G01C 19/30
[52] U.S. Cl. .................. 74/5.43; 74/5.6 B; 74/5.8
[58] Field of Search .......... 74/5.43, 5.6 B, 5 R, 74/5.8, 5 F

[56] References Cited

U.S. PATENT DOCUMENTS

| | | | |
|---|---|---|---|
| 2,959,059 | 11/1960 | Jorgensen | 74/5 |
| 3,002,392 | 10/1961 | Scotto | 74/5 F |
| 3,080,762 | 3/1963 | Adams | 74/5 |
| 3,310,987 | 3/1967 | Huizinga et al. | 74/5.43 |
| 4,088,031 | 5/1978 | Sholes | 74/5.43 |

FOREIGN PATENT DOCUMENTS

| | | | |
|---|---|---|---|
| 583902 | 1/1947 | United Kingdom | 74/5.43 |
| 840370 | 7/1960 | United Kingdom | 74/5 R |

Primary Examiner—Rodney H. Bonck

[57] ABSTRACT

An improved air valve limit for an attitude gyro unit including a flexible strand fastened at its ends to the gyro housing and at midpoints to the gyro and valves.

3 Claims, 6 Drawing Figures

LIMIT MEANS FOR AIR JET RESPONSIVE GYROSCOPES

SUMMARY OF THE INVENTION

This invention relates to an improved air valve limit for an aircraft attitude gyro unit.

The gyro operates in response to air jets passing through the housing and exhausting from openings in the gyro housing. There are usually four openings in the gyro housing spaced 90° from each other. A pivoted valve partially covers each opening when the aircraft is in its normal level-flight position. The valves are arranged in opposite pairs and are situated so that when one valve of each pair of valves completely covers an opening the opposed opening is open.

In the conventional gyro unit, the gyro housing is provided with stops which are arranged on the housing to limit the range of pivotal movement of the valves. A problem with this construction has been one of adhesion of a valve to a stop as it comes in contact with a stop. Adhesion is caused by corrosion, moisture, or electrolytic attraction between dissimilar metals of the stops and the valves. Adhesion of a valve to a stop causes the gyro housing to take a false position, and an incorrect indication of the aircraft's orientation with relation to the earth.

The present invention solves the problem of adhesion by connecting each pivoted valve to the gyro housing by a light-weight flexible strand such as a thread. The strand is connected at its ends to posts upon the body of the gyro housing and is connected to the valves. The strand permits shifting of the valves to span the respective openings in the gyro housing or to fully open the respective openings and limits the maximum travel of the valves about their pivot points.

Accordingly, it is an object of this invention to provide a novel and useful air valve limit for an attitude gyro.

Another object of this invention is to provide an air valve limit for an attitude gyro which prevents the gyro housing from taking a false position.

Another object of this invention is to provide an air valve limit for an attitude gyro consisting of a light-weight flexible strand attached to the gyro housing and to the valve.

Other objects of this invention will be apparent upon a reading of the following description.

DESCRIPTION OF THE PREFERRED EMBODIMENT

The preferred embodiment illustrated is not intended to be exhaustive or to limit the invention to the precise form disclosed. It is chosen and described in order to explain the principles of the invention and its application and practical use, to thereby enable others skilled in the art to utilize the invention.

Figure 1:
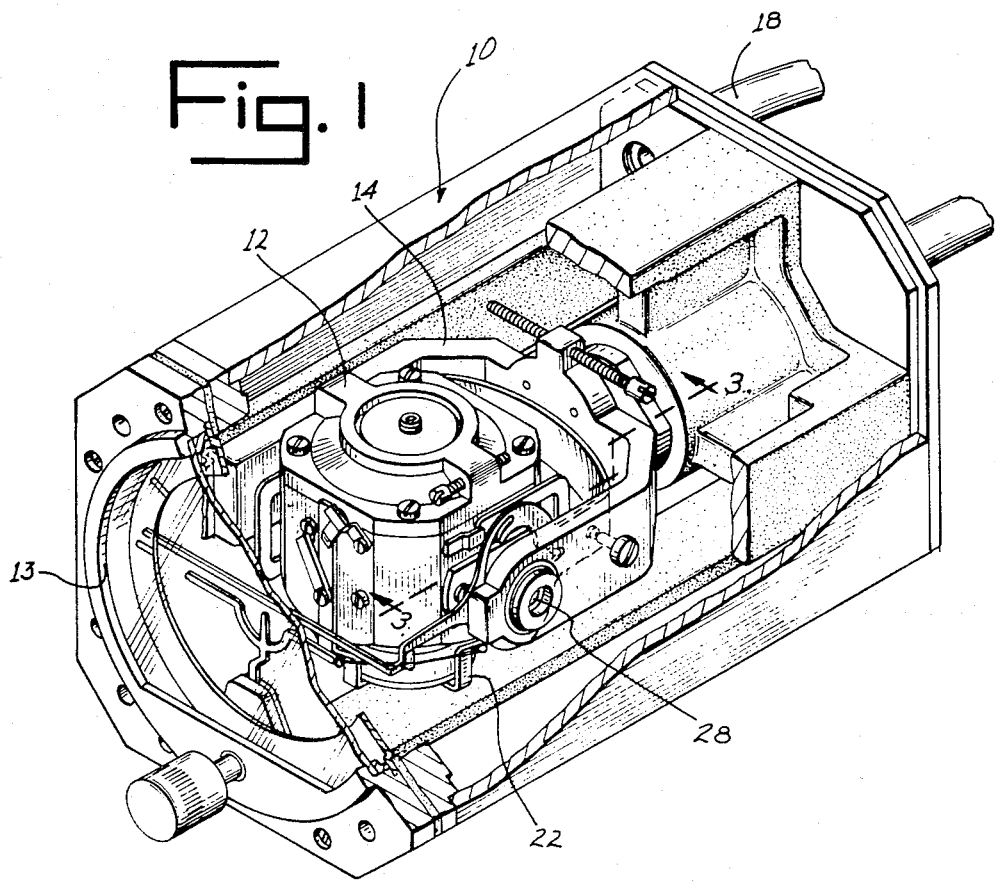
FIG. 1 is a perspective view of a gyro unit with parts broken away.
Figure 2:
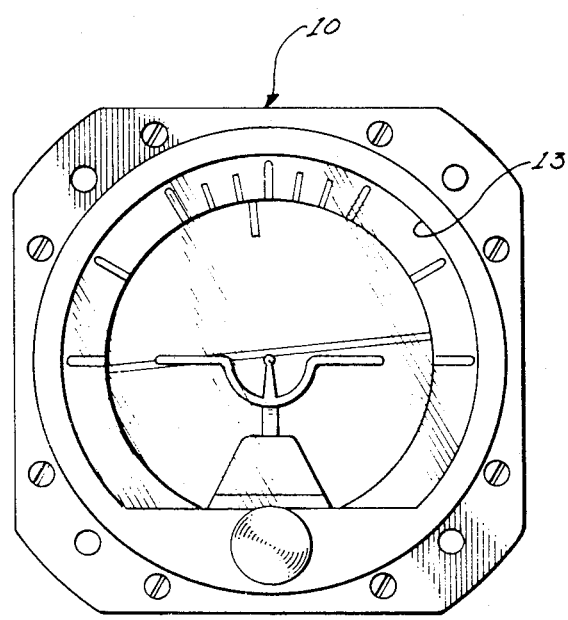
FIG. 2 is a front view of the gyro unit of FIG. 1.
Figure 3:
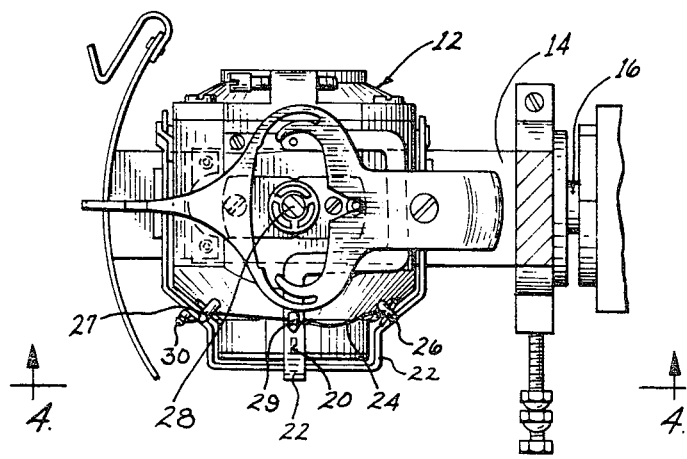
FIG. 3 is a view of the gyro unit taken on line 3—3 of FIG. 1 with my novel air valve limits applied thereto.
Figure 5:
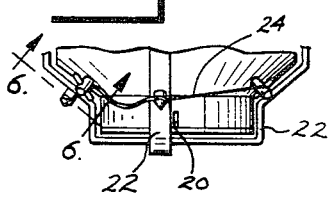
FIG. 5 is a fragmentary side view of the gyro housing showing the air valve limit of this invention.
Figure 4:
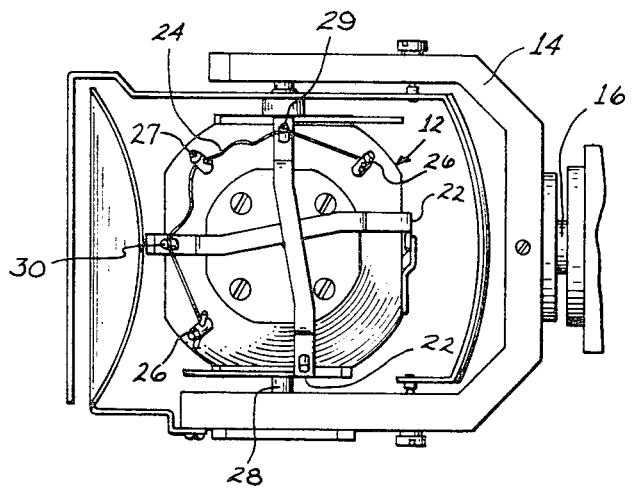
FIG. 4 is a view taken along line 4—4 of FIG. 3.

The attitude indicator gyro unit includes an enclosure 10 having an air admission opening, a connection to a vacuum pump (not shown), and a sight opening 13. A shiftable gyro housing 12 is mounted in a gimbal joint including a U-shaped member 14 pivoted at 16 to rotate about a horizontal axis. Gyro housing 12 is rotatably mounted within U-shaped member 14 on a transverse axis 28 that is perpendicular to the axis of rotation of the member 14. A gyro rotor (not shown) is rotatable about a vertical axis with gyro housing 12 in response to air drawn through the housing. The air exhausts into enclosure 10 from gyro housing 12 through openings 20 in the bottom of the housing which are spaced at 90° intervals about the circumference of the housing 12. The attitude indicator operates in the conventional manner of such indicators in response to air flow through openings 20. Each opening 20 is normally partially covered by a valve member or plate 22 pivotally connected to gyro housing 12 to always hang in a vertical position. Each valve member 22 is connected to or paired with another member 22 which normally partially spans an opening displaced 180° from the valve paired therewith. Two valve pairs are paired similarly relative to the two remaining openings. The two pairs of valve members are pivoted to housing 12 on axes displaced 90°. Tilting of U-shaped member 14 in response to banking of the aircraft to the left or right or to tilting of gyro housing 12 about axis 28 in response to variation of the attitude of the aircraft causes one or both of the valve pairs 22 to shift to uncover one opening 20 while spanning an opposite opening 20. As a result, the gyro housing will right itself in response to force from the difference in air flow through opposed openings 20 and principles of precession to give an appropriate reading of the position of the aircraft relative to the horizon, as shown by example in FIG. 2.

The invention herein lies in the provision of limits which prevent valves 22 from shifting to such an extent that an opposed pair of openings 20 would be simultaneously open, thus yielding an incorrect output reading. The limits consist of a lightweight flexible strand 24 or thread which is substantially inextensible and which preferably has a breaking point of approximately 2½ pounds. A thread made of 100% spun polyester of grade 50 satisfies such requirements. Strand 24 is fastened at its ends to pins 26, projecting from gyro housing 12 at substantially diametrically opposed points and is anchored substantially centrally thereof to a pin 27 projecting from housing 12.

Figure 6:
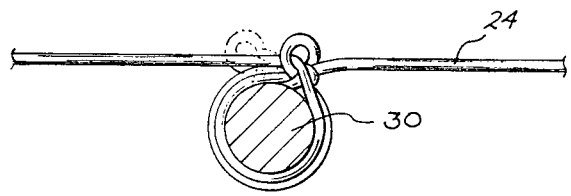
FIG. 6 is an enlarged fragmentary sectional view taken along line 6—6 of FIG. 5.

Strand 24 is fastened loosely, in a manner such as that illustrated in FIG. 6, intermediate its ends to a pin 29 on one valve pair 22 between one pin 26 and pin 27. Pin 29 is preferably located intermediate the pivot point of valve 22 and the point where it covers opening 20. Strand 24 has similarly fastened to its opposite end portion between pin 27 and second pin 26, a pin 30 on the second valve pair 22. The opposite strand end portions between the respective pins 26 and intermediate pin 27 are sufficiently slack to permit free pivotal movement of the respective valve pairs between selected limits permitting complete spanning of one opening 20 by one valve plate of each pair and complete clearance of the diametrically opposed opening by the other valve plate of each pair. Strands 24 prevent binding or adhesion of valves 22 to housing 12.

Valves 22 are shown as linked in offset or opposed pairs in the embodiment illustrated, but may also be four separate members pivoted to valve housing 12 to perform their function of covering and uncovering openings 20 in response to changes in attitude of the airplane. In such a construction appropriate strands limit the pivoting of each in relation to the opening 20 with which it is associated.

It is to be understood that the invention is not to be limited by the terms of the description above but may be modified with the scope of the appended claims.

I claim:

1. In an attitude indicator for aircraft including a gyro which is contained in a housing having an air inlet opening and a plurality of air outlet openings, a gimbal joint mounting said gyro housing, said gyro spinning in response to air drawn through said inlet opening and outlet openings by a vacuum pump, valve means pivotally connected to said gyro housing and responsive to the position of said gyro housing to regulate the rate of flow of air from said outlet openings in response to movement of said aircraft from a selected horizon reference attitude, and limit means for controlling the amount of travel of said valve means, the improvement wherein said limit means includes a light-weight flexible strand having a breaking point greater than the force exerted by pivotal movement of the valve means, said strand being anchored at spaced parts thereof to said gyro housing and to said valve means at a midpoint of said strand whereby travel of said valve means is limited by the length of said strand between the points of connection thereof to said housing and to said valve means, said valve means pivoting substantially without restraint between said limits.

2. The attitude indicator for aircraft of claim 1 wherein said outlet openings include a first and second pair of oppositely spaced slots in said gyro housing, said valve means including plates suspended in pendulum fashion whereby each plate partially covers a corresponding outlet opening when said aircraft is in said horizon reference attitude, said plates being connected in pairs wherein each pair consists of oppositely spaced plates rigidly connected by a cross member and shifting in response to shifts of said aircraft from said horizon reference position, said strand being connected at its ends to anchor points on said gyro housing with a pair of said plates being anchored to said strand between said housing anchor points.

3. The attitude indicator of claim 2 wherein said strand attaches to said pair of plates at a point on one of the plates intermediate its point of pivoting attachment to said gyro housing and one of said slots.

* * * * *